S. McCLANATHAN.
Bee Hive.
No. 38,012.
Patented March 24, 1863.
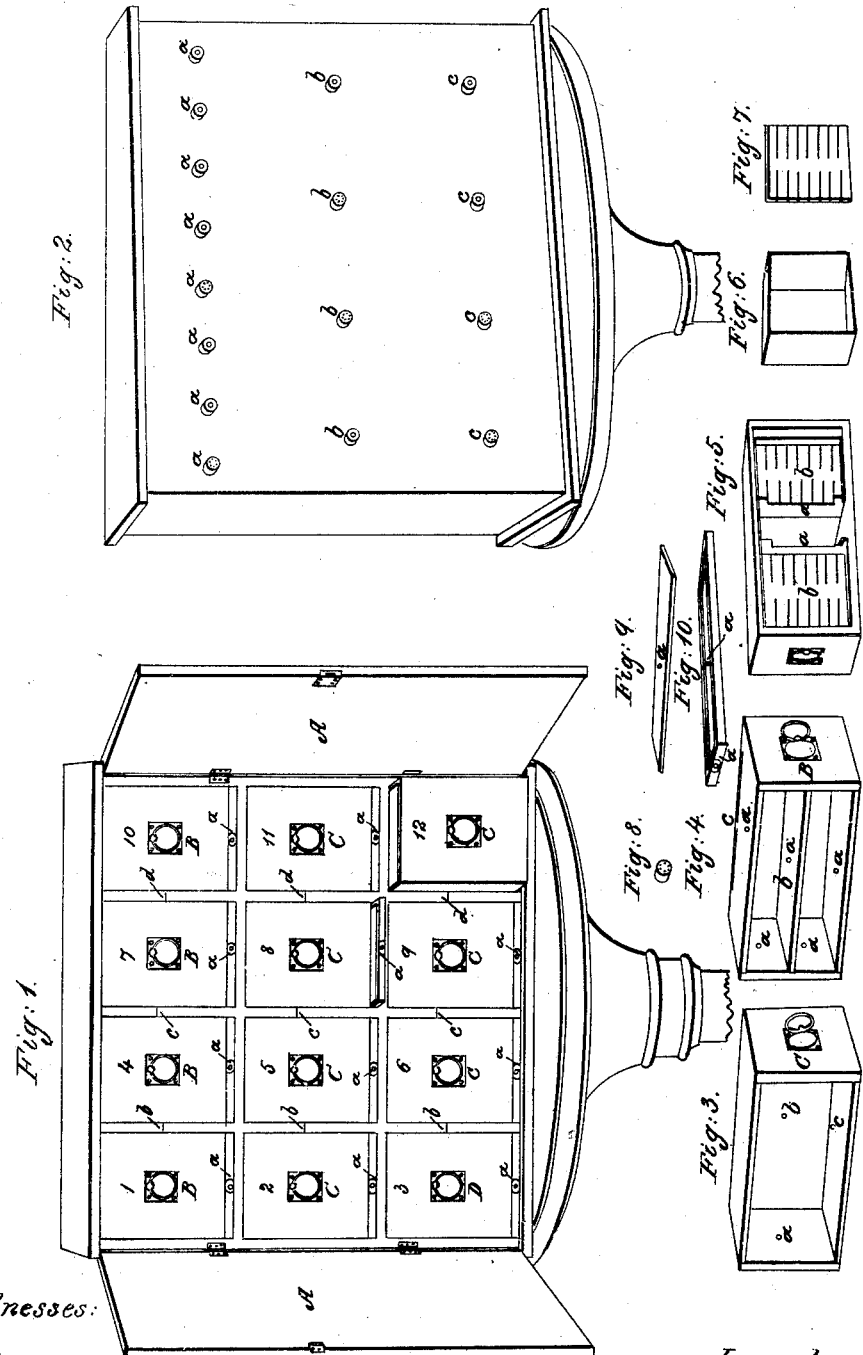

UNITED STATES PATENT OFFICE.

SAMUEL McCLANATHAN, OF WARREN, ILLINOIS.

IMPROVEMENT IN BEE-HIVES.

Specification forming part of Letters Patent No. 38,012, dated March 24, 1863.

*To all whom it may concern:*

Be it known that I, SAMUEL McCLANATHAN, of Warren, in the county of Jo Daviess, in the State of Illinois, (but formerly of Buena Vista, in the county of Grant, in the State of Wisconsin,) have invented a new and Improved Mode of Constructing a Bee-Hive; and I do hereby declare that the following is a full and exact description thereof, reference being had to the accompanying drawings, and to the letters, figures, and marks of reference marked thereon.

Under each drawer, from 1 to 12, inclusive, there is a slide with raised edges for removing the litter of the bees, dead bees, &c. (See Figure 10, also *a*, on the end of the slide.) In very hot weather the doors A A can be opened and the slides taken out, which will most thoroughly ventilate, if needful. The hive is supplied with a bee-feeder, D, (see also Fig. 5,) which can be used in each section of the hive by taking out a brooding-drawer, C. The front of the hive, Fig. 2, is furnished with projecting funnel-shaped tubes, for the ingress and egress of the bees, which tubes are so arranged as to correspond with each separate section, when used conjointly for from one to three swarms inclusive, or when used separately for four swarms. *a a b c* are the apertures of one section. Each of these tubes is supplied with a metallic cap, in which is punched small holes, which caps are used for ventilation, and also for the security of the bees when needful. (See Fig. 8.) The apertures in the two middle sections are varied, (see variation between *b d*, marked *c*,) so that by change of the drawers the apertures may be made to coincide, or not, at pleasure; also the two outsides of the two outside sections have no apertures, from which arise the rest of the variations in forming the different combinations when used in conjunction. The table-honey drawer, Fig. 4, with partition *b*, is an improvement on table-honey drawers, six inches square and about fifteen in length, which drawer, Fig. 4, can be used for one swarm, instead of using from one to ten or from one to six small drawers, inclusive. First, there is a saving in expense of manufacturing; secondly, a greater amount of table-honey is secured from drawer, Fig. 4, it being arranged in a section where more working-bees can be sustained than in the small hives, which have only one brooding drawer or box, with from one to six or from one to ten, inclusive, of these small drawers surrounding it; also Fig. 4 drawer will produce honey of a better flavor, as it is well ventilated and of a nicer quality. The slide with raised edges, Fig. 10, (see also end view, *a*, as represented in Fig. 1,) which slide is an improvement on the wire-screen bottoms. The slide affords no lodgement underneath it for the miller or other insects. Its use is for cleaning out the litter of the hive, dead bees, &c. The wire-screen bottoms have a lodgment for millers underneath them from which filthy effluvia must necessarily rise into the brooding-box or residence of the bees, which is doubtless odious to them. The tubes may be considered as an improvement on the old modes of entrance, which tubes are so constructed as to use the least amount of room possible for the ingress and egress of the bees. (See Fig. 2, front view.) The tube-cap ventilators, Fig. 8, are an improvement on more limited modes of ventilation, as any or all the tubes may be used for ventilation by putting on the cap-ventilators, which will secure the swarms from wasting through the inclement seasons of the year.

To enable others skilled in the art to make and use my invention, I will proceed to describe its construction and use.

The outside or shell of the hive, and the partitions which separate all the drawers throughout the entire hive and the ends of all the drawers, are inch lumber. The top and sides of all the drawers and the slides are three-quarter stuff. The positions in Fig. 4 are half inch. The height of the hive is three feet and ten inches and three-fourths of an inch. The width is four feet and one inch, and the depth, or from back to front, is two feet and two inches.

Fig. 1 represents the back view of the hive. As the hive now stands, all its sections can be used in conjunction—namely, for one swarm. If we wish to form the hive into two parts for two swarms, it can be effected by placing 1, 2, and 3 in the place of 7, 8, and 9, and 7, 8, and 9 in the place of 1, 2, and 3. By placing the drawers 1, 2, and 3 in the place of 10, 11, and 12, and 10, 11, and 12 in the place of 1, 2, and 3, we have three sections for three swarms; but if we wish to form four complete apartments or sections, we will take 4, 5, and 6 and put them in the place of 7, 8, and 9, and 7, 8, and 9 in the place of 4, 5, and 6. (See variation between *b d*, marked *c*.) The slides underneath the drawers have a raised edge of half an inch, Fig. 10.

Fig. 9 is the cover of the bee-feeder.

The table-honey drawers, Fig. 4, are the same as the brooding-drawers, except the partition *b* and the slits in the upper edges of the drawer *c* to put in a knife to separate the comb from the top of the drawer.

Fig. 3 represents a brooding-drawer, which is eleven inches in width and thirteen inches in depth and two feet in length. All the drawers, from 1 to 12 inclusive, are of the same dimensions.

The small *a* represents the apertures in all the drawers. (See sides, tops, and ends.)

Fig. 5 is the bee-feeder. Fig. 6 is a tin box, of such dimensions that two of them can be placed in the feeder—one in each end—leaving a space between them, allowing the bees to pass and repass. Fig. 7 is a board with slits, which is fitted in each of the tin boxes, Fig. 6.

The projecting tubes are one inch and one-fourth of an inch in diameter and one inch projection from the face of the hive. (See Fig. 2, front of the hive.)

I do not claim the bee-feeder as a new invention, neither as an improvement. I only claim it with reference to its particular connection with the sections of my hive. Neither do I claim the brooding-drawers, Fig. 3, only in their particular arrangement, as particularly connected with the sections of my hive; but What I do claim as my invention, and desire to secure by Letters Patent, is—

1. The combination and arrangement of the hive-sections and interchangeable boxes or drawers, substantially as and for the purposes herein specified.

2. The projecting, funnel-shaped entrance-tubes, with their ventilating-caps, substantially as specified.

SAMUEL McCLANATHAN.

Witnesses:
S. BOOKER,
J. SHERK.